United States Patent
Kim et al.

(10) Patent No.: US 8,865,328 B2
(45) Date of Patent: Oct. 21, 2014

(54) BATTERY PROTECTING CIRCUIT, METHOD OF CONTROLLING THE SAME, AND BATTERY PACK

(75) Inventors: Beom-Gyu Kim, Yongin-Si (KR);
Susumu Segawa, Yongin-Si (KR);
Eui-Jeong Hwang, Yongin-Si (KR);
Se-Sub Sim, Yongin-Si (KR);
Jong-Woon Yang, Yongin-Si (KR);
Han-Seok Yun, Yongin-Si (KR);
Jin-Wan Kim, Yongin-Si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 352 days.

(21) Appl. No.: 13/037,158

(22) Filed: Feb. 28, 2011

(65) Prior Publication Data

US 2011/0305926 A1 Dec. 15, 2011

Related U.S. Application Data

(60) Provisional application No. 61/353,088, filed on Jun. 9, 2010.

(51) Int. Cl.
| | | |
|---|---|---|
| *H01M 14/00* | (2006.01) | |
| *H01M 2/00* | (2006.01) | |
| *H01M 10/48* | (2006.01) | |
| *H02J 7/00* | (2006.01) | |
| *H03L 5/00* | (2006.01) | |

(52) U.S. Cl.
CPC .............. *H02J 7/0031* (2013.01); *H02J 7/0047* (2013.01)
USPC .................. 429/7; 429/61; 429/90; 320/134; 320/135; 320/136; 327/307

(58) Field of Classification Search
CPC ....... H01M 10/44; H01M 10/48; H01M 8/16; H01M 2/00; H02J 7/00
USPC ............ 429/7, 50, 90, 61; 320/162, 112, 116, 320/118, 134–136, 120, 132; 327/403; 307/19, 23, 24, 80, 66; 318/139; 324/434; 700/292–293
See application file for complete search history.

(56) References Cited

U.S. PATENT DOCUMENTS

| | | | |
|---|---|---|---|
| 7,538,518 B2 | 5/2009 | Wang et al. | |
| 7,630,843 B2 | 12/2009 | Nguyen | |

(Continued)

FOREIGN PATENT DOCUMENTS

| | | | |
|---|---|---|---|
| JP | 2005-065390 A | 3/2005 | |
| JP | 2009-124883 A | 6/2009 | |

(Continued)

OTHER PUBLICATIONS

Korean Office Action dated Oct. 11, 2012 for Korean Patent Application No. KR 10-2011-0035155 which claims priority from U.S. Appl. No. 61/353,088, filed Jun. 9, 2010, and captioned U.S. Appl. No. 13/037,158.

(Continued)

*Primary Examiner* — Patrick Ryan
*Assistant Examiner* — Kiran Quraishi
(74) *Attorney, Agent, or Firm* — Knobbe, Martens, Olson & Bear LLP

(57) ABSTRACT

A battery pack is disclosed. The battery pack has an analog front end which senses if a failure occurs in a microcontroller, and interrupts charging and discharging of the battery in response to the failure.

16 Claims, 7 Drawing Sheets

(56) References Cited

U.S. PATENT DOCUMENTS

| | | |
|---|---|---|
| 2006/0022637 A1 | 2/2006 | Wang et al. |
| 2008/0077340 A1 | 3/2008 | Nguyen |
| 2008/0100272 A1* | 5/2008 | Yoshio .................. 323/266 |
| 2009/0176146 A1 | 7/2009 | Matsuura et al. |
| 2009/0256521 A1 | 10/2009 | Mori et al. |
| 2009/0295334 A1* | 12/2009 | Yang et al. ............... 320/134 |
| 2010/0253287 A1 | 10/2010 | Kim et al. |

FOREIGN PATENT DOCUMENTS

| | | |
|---|---|---|
| JP | 2009-145139 A | 7/2009 |
| JP | 2009-261092 A | 11/2009 |
| JP | 2009-296873 A | 12/2009 |
| JP | 2011-523337 A | 8/2011 |
| KR | 10-2007-0096645 A | 10/2007 |
| KR | 10-2009-0072281 A | 7/2009 |
| KR | 10-2009-0126097 A | 12/2009 |
| WO | WO 2009/145577 A2 | 12/2009 |

OTHER PUBLICATIONS

Japanese Office Action dated Dec. 19, 2012 for Japanese Patent Application No. JP 2011-125255 which shares priority of U.S. Appl. No. 61/353,088, filed Jun. 9, 2010, with captioned U.S. Appl. No. 13/037,158.

Japanese Office Action dated Apr. 16, 2013 for Japanese Patent Application No. JP 2011-125255 which claims priority from U.S. Appl. No. 61/353,088, filed Jun. 9, 2010; and captioned U.S. Appl. No. 13/037,158.

* cited by examiner

BATTERY PROTECTING CIRCUIT, METHOD OF CONTROLLING THE SAME, AND BATTERY PACK

CROSS-REFERENCE TO RELATED APPLICATIONS

This application claims priority to U.S. Provisional No. 61/353,088, titled "BATTERY PROTECTING CIRCUIT, CONTROLLING METHOD OF THE SAME AND BATTERY PACK" filed Jun. 9, 2010, which is hereby incorporated by reference in its entirety.

BACKGROUND

1. Field

The disclosed technology relates to a battery protecting circuit, a method of controlling the same, and a battery pack.

2. Description of the Related Technology

With an increase in use of portable electronic devices, such as mobile phones, digital cameras, laptop computers, and the like, batteries for supplying power to operate such portable electronic devices have been developed.

Batteries are often provided as a battery pack including a battery cell and a protection circuit that controls charging and discharging of the battery cell. Batteries may be any of lithium ion (Li-ion) batteries, nickel-cadmium (Ni—Cd) batteries, or the like according to the type of a battery cell. The battery cell may be used as a rechargeable secondary battery.

Some batteries further include microcontrollers or other programmable processors which are used to control the operation of the battery such that the battery operates properly and is protected from excessive currents which can damage or destroy the battery. Batteries may, therefore, be susceptible to failure if the microcontroller malfunctions.

SUMMARY OF CERTAIN INVENTIVE ASPECTS

One inventive aspect is a battery pack, which includes a battery cell, a terminal unit, and a switch configured to selectively connect the battery cell and the terminal unit. The battery pack also includes a microcontroller configured to generate commands, and an analog front end configured to receive the commands from the microcontroller and to control charging and discharging of the battery cell according to the commands. The analog front end includes a status input terminal configured to receive a status signal indicative of a status of the microcontroller, a failure determination processor configured to determine whether the microcontroller has experienced a failure based on the status signal and to generate a failure signal, and a switch controller configured to control the switch according to the failure signal.

Another inventive aspect is a method of controlling a battery pack, where the battery pack includes a battery cell, a terminal unit, and an analog front end in communication with a microcontroller. The method includes the analog front end receiving a status signal indicating a status of the microcontroller, the analog front end determining whether the microcontroller has experienced a failure, and the analog front end generating a control signal to disconnect the battery cell from the terminal unit if the microcontroller has experienced a failure.

DETAILED DESCRIPTION OF CERTAIN INVENTIVE EMBODIMENTS

Certain embodiments are described more fully with reference to the accompanying drawings, in which various inventive aspects and features are shown. In the following description, various features are described, and a detailed description of certain other features are not provided to not obscure the inventive subject matter. Unless otherwise defined, terms used herein have the meaning as commonly understood by one of ordinary skill in the art to which this invention belongs. It will be further understood that terms should be interpreted as having a meaning that is consistent with their meaning in the context of the relevant art and will not be interpreted in an idealized or overly formal sense unless expressly so defined herein.

Figure 1:
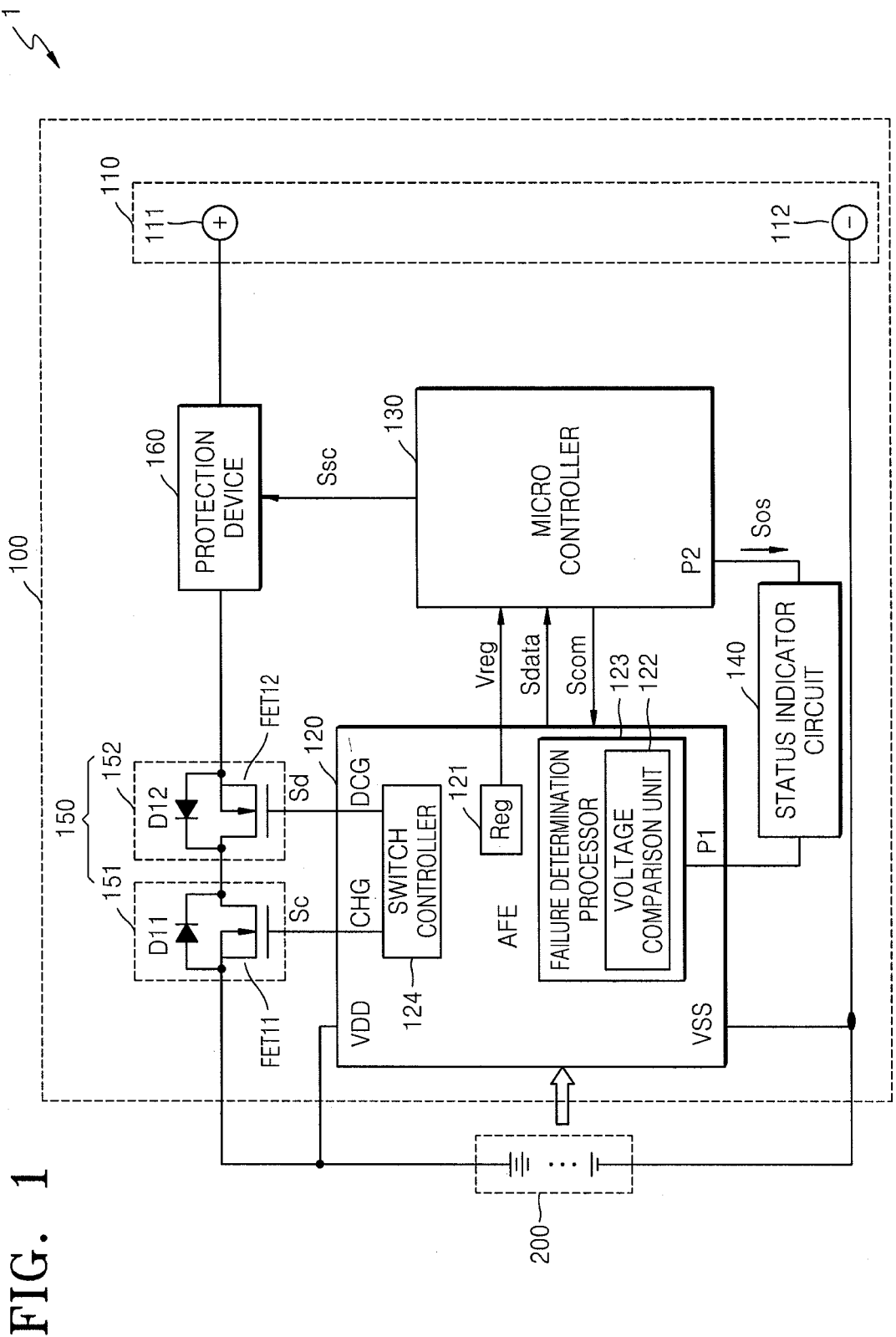
FIG. 1 is a block diagram of a battery pack according to an embodiment.

FIG. 1 is a block diagram of a battery pack 1 according to an embodiment.

Referring to FIG. 1, the battery pack 1 includes a battery protection circuit 100 (hereinafter, a 'protection circuit') and a battery cell 200.

The battery cell 200 includes at least one bare cell. The battery cell is connected to the protection circuit 100. Charging or discharging occurs when an external device is connected to a terminal unit 110 of the protection circuit 100. The battery cell 200 may be a rechargeable secondary battery.

The protection circuit 100 controls charging and discharging of the battery cell 200, and senses an abnormal condition of the battery cell 200 to prevent damage to the battery cell 200. The protection circuit 100 includes the terminal unit 110, an analog front-end 120, a microcontroller or processor 130, a status indicator circuit 140, a charging/discharging switch 150, and a protection device 160.

The terminal unit 110 is connected to a charging device for charging the battery cell 200 or an external device. The external device may be a load consuming electric energy stored in the battery cell 200. The terminal unit 110 includes a positive terminal 111 and a negative terminal 112. If the charging device is connected to the terminal unit 110, charging may occur in the battery pack 1. While charging, current flows into the battery pack 1 via the positive terminal 111 and flows out of the battery pack 1 via the negative terminal 112. If the external device is connected to the terminal unit 110, discharging may occur in the battery pack 1. While discharging, current flows out of the battery pack 1 via the positive terminal 111 and flows into the battery pack 1 via the negative terminal.

The analog front-end 120 controls charging and discharging of the battery cell 200. The analog front-end 120 senses a charge/discharge status of the battery cell 200, such as an internal current flow status of the battery pack 1, the temperature of the battery pack 1, and the like. The analog front-end 120 transmits the sensed data as sensed data Sdata to the microcontroller 130. Although in FIG. 1 the sensed data Sdata are denoted with a single arrow, the sensed data Sdata may include a plurality of data and may be conveyed over a plurality of data lines. For example, the sensed data Sdata may include temperature data, voltage data, current data, and the like. In addition, the data may be transmitted to the microcontroller 130 through separate signal transfer lines, respectively.

The analog front-end 120 operates using a voltage of the battery cell 200. The analog front-end 120 includes a regulator 121 to generate a power voltage Vreg and to apply the power voltage Vreg to the microcontroller 130.

The analog front-end 120 receives a command signal Scom from the microcontroller 130, and applies a charge control signal Sc or a discharge control signal Sd to the charging/discharging switch 150 according to the command signal Scom to control an On/Off state of the charging/discharging switch 150.

The analog front-end 120 may include a failure determination processor 123 and a switch controller 124. The failure determination processor 123 receives a signal output from the status indicator circuit 140 via a status input terminal P1, and determines that the microcontroller 130 is malfunctioning, if the magnitude of the received signal falls within predetermined conditions. For example, the failure determination processor 123 may determine that the microcontroller 130 is malfunctioning, if the magnitude of the received signal is smaller or equal to that of a reference voltage Vref. Alternatively, the failure determination processor 123 may determine that the microcontroller 130 is malfunctioning, when the received signal changes from a logic high to a logic low or vice versa. If the failure determination processor 123 determines that the microcontroller 130 is malfunctioning, the switch controller 124 transmits the charge control signal Sc or the discharge control signal Sd to the charging/discharging switch 150 to turn off the charging/discharging switch 150.

The microcontroller 130 receives the power voltage Vreg from the analog front-end 120 as a power source. The microcontroller 130 receives the sensed data Sdata from the analog front-end 120, and transmits the command signal Scom to the analog front-end 120 according to the sensed data Sdata to control the operation of the analog front-end 120. For example, if there is a voltage variation among individual bare cells of the battery cell 200, the microcontroller 130 may control the analog front-end 120 to control a cell balancing operation in order for the bare cells to have a constant voltage. As another example, if the battery cell 200 has an over-charge or over-discharge status, the microcontroller 130 may execute control to stop a charge or discharge operation of the battery cell 200. Although in FIG. 1 the command signal Scorn is denoted with a single arrow, for convenience of explanation, the command signal Scorn may include a plurality of commands. In some embodiments, the plurality of command signals may be transmitted to the analog front-end 120 through separate signal transfer lines.

In some embodiments, if the analog front-end 120 is malfunctioning, the microcontroller 130 senses that the analog front-end 120 is malfunctioning and to protect the battery pack, controls the protection device 160 to stop a charge or discharge operation of the battery cell 200. In some embodiments, the protection device 160 does not require external control and operates autonomously.

The microcontroller 130 outputs an operation status signal Sos to the status indicator circuit 140 via a terminal P2 for the analog front-end 120 to sense a failure or a malfunction of the microcontroller 130. For example, if the microcontroller 130 is in a normal condition, a logic high signal may be output as the operation status signal Sos. Alternatively, if the microcontroller 130 is in a normal condition, a continuous series of pulses may be output as the operation status signal Sos.

The status indicator circuit 140 receives the operation status signal Sos and generates a status signal for the analog front-end 120. The status indicator circuit 140 outputs status signals to the analog front end 120 indicating whether the microcontroller 130 is in a normal condition or in an abnormal condition, so that the failure determination processor 123 of the analog front-end 120 can sense the status signals.

The charging/discharging switch 150 includes a charge control switch 151 and a discharge control switch 152. Each of the charge control switch 151 and the discharge control switch 152 may include a field effect transistor (FET) and a parasitic diode. For example, the charge control switch 151 includes a field effect transistor FET11 and a parasitic diode D11. The discharge control switch 152 includes a field effect transistor FET12 and a parasitic diode D12. The direction in which a source and a drain of the field effect transistor FET 1 of the charge control switch 151 are connected is opposite to the direction in which those of the field effect transistor FET2 of the discharge control switch device 152 are connected. In other words, in this embodiment, the field effect transistor FET11 of the charge control switch 151 is connected so as to restrict the flow of current between the positive terminal 111 and the battery cell 200. On the other hand, the field effect transistor FET12 of the discharge control switch 152 is connected so as to restrict the flow of current between the battery cell 200 and the positive terminal 111. In this regard, the field effect transistor FET11 of the charge control switch 151 and the field effect transistor FET12 of the discharge control switch 152 are switching devices. However, the field effect transistors FET11 and FET12 are not limited thereto and may be any electric device with a switching function. The parasitic diode D11 of the charge control switch 151 and the parasitic diode D12 of the discharge control switch 152 may be arranged in such a way that currents flow therethrough in directions opposite to directions in which the field effect transistors FETs 11 and 12 respectively restrict flow of current.

The protection device 160 is arranged in a high current path (HCP) to control the flow of current out of the battery cell 200 or the flow of current into the battery cell 200. The protection device 160 operates when the analog front-end 120 experiences a failure. The protection device 160 may be a fuse or a positive temperature coefficient (PTC) thermistor. Alternatively, the protection device 160 may be a device that may autonomously operate according to a flow of current therethrough. Alternatively, the protection device 160 may be a device that may operate under the control of the microcontroller 130.

Hereinafter, the status indicator circuit 140 is described in greater detail.

Figure 2:
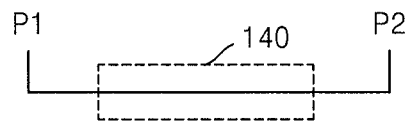
FIG. 2 is a circuit diagram of a status indicator circuit according to an embodiment.
Figure 3:
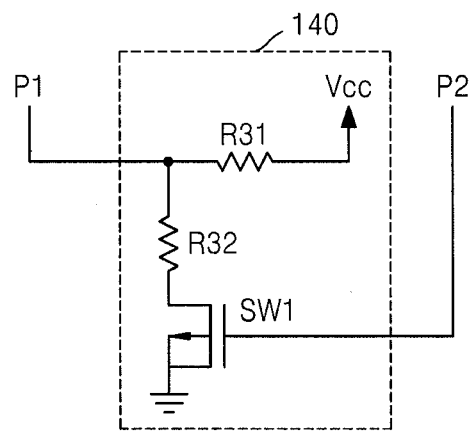
FIG. 3 is a circuit diagram of a status indicator circuit according to another embodiment.

FIGS. 2 and 3 are circuit diagrams of embodiments of the status indicator circuit 140 of FIG. 1, respectively.

Referring to FIG. 2, the status indicator circuit 140 may be a signal line directly connecting the terminal P2 of the microcontroller 130 and the status input terminal P1 of the analog front-end 120. in some embodiments, if in a normal condition, the microcontroller 130 outputs a logic high signal as the operation status signal Sos. The analog front-end 120 may determine that the microcontroller 130 is having a failure, if the failure determination processor 123 determines that the level of the operation status signal Sos received via the status input terminal P1 and the status indicator circuit 140 is smaller or equal to the level of the reference voltage Vref. The reference voltage Vref may have a level that is predetermined when manufacturing the battery pack 1.

Referring to FIG. 3, in some embodiments, the status indicator circuit 140 comprises a level shifter circuit including a plurality of resistors R31 and R32, and a switching device SW1. The resistor R31 is connected between the status input terminal P1 and a voltage source of a first voltage Vcc. The resistor R32 is connected between the status input terminal P1 and a first electrode of the switching device SW1. A second electrode of the switching device SW1 is connected to ground. A gate electrode of the switching device SW1 is connected to the terminal P2. The switching device SW1 may be a p-channel field effect transistor (FET).

Under normal conditions, the microcontroller 130 outputs a logic high signal as the operation status signal Sos. Accordingly, the switching device SW1 of the status indicator circuit 140 is turned off by the operation status signal Sos, so that the first voltage Vcc is applied to the status input terminal P1. The first voltage Vcc has a level greater than the reference voltage Vref. The failure determination processor 123 determines that the first voltage Vcc received through the status input terminal P1 has a level greater than the reference voltage Vref, and the analog front-end 120 determines that the microcontroller 130 is in a normal condition.

On the other hand, if a failure or malfunction condition occurs, the microcontroller 130 outputs a logic low signal as the operation status signal Sos or stops outputting the operation status signal Sos. As a result, the switching device SW1 of the status indicator circuit 140 is turned on by the operation status signal Sos, so that a voltage divided from the first voltage Vcc by the resistors R31 and R32 is applied to the status input terminal P1. For example, the voltage applied to the status input terminal P1 may be approximated as Vcc*R32/(R31+R32). In this regard, the resistors R31 and R32 may be designed in such a way that the voltage has a level less than the reference voltage Vref. Accordingly, the failure determination processor 123 determines that the output signal of the status indicator circuit 140 received through the status input terminal P1 has a level less than the reference voltage Vref, and the analog front-end 120 determines that the microcontroller 130 has failed.

Figure 4:
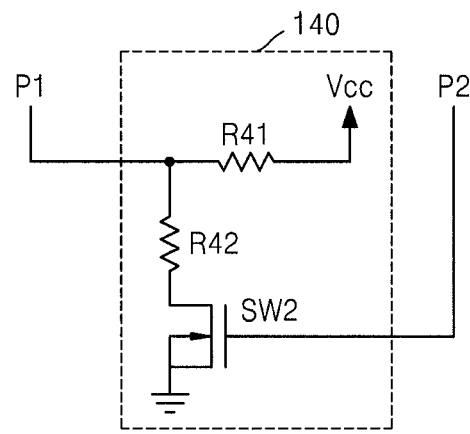
FIG. 4 is a circuit diagram of a status indicator circuit according to another embodiment.

FIG. 4 is a circuit diagram of an embodiment of the status indicator circuit 140 of FIG. 1.

Referring to FIG. 4, the status indicator circuit 140 according to the embodiment of FIG. 4 comprises an inverting level shifter circuit including a plurality of resistors R41 and R42, and a switching device SW2. The resistor R41 is connected between the status input terminal P1 and a voltage source of a first voltage Vcc. The resistor R42 is connected between the status input terminal P1 and a first electrode of the switching device SW2. A second electrode of the switching device SW2 is connected to ground. A gate electrode of the switching device SW2 is connected to the terminal P2. The switching device SW2 may be an n-channel field effect transistor (FET).

In a normal condition, the microcontroller 130 outputs a logic high signal as the operation status signal Sos. As a result, the switching device SW2 of the status indicator circuit 140 is turned on by the operation status signal Sos, so that a voltage divided from the first voltage Vcc by the resistors R41 and R42 is applied to the status input terminal P1. For example, the partial voltage applied to the status input terminal P1 may be approximated as Vcc*R42/(R41+R42). In this regard, the resistors R41 and R42 may be designed such that the voltage has a level less than the reference voltage Vref. The failure determination processor 123 determines that the output signal of the status indicator circuit 140 received through the status input terminal P1 is less than the reference voltage Vref, and the analog front-end 120 determines that the microcontroller 130 is in a normal condition.

On the other hand, if a failure or malfunction condition occurs, the microcontroller 130 outputs a logic low signal as the operation status signal Sos or stops outputting the operation status signal Sos. As a result, the switching device SW2 of the status indicator circuit 140 is turned off by the operation status signal Sos, so that the first voltage Vcc is applied to the status input terminal P1. The first voltage Vcc has a level greater than the reference voltage Vref. The failure determination processor 123 determines that the first voltage Vcc received through the status input terminal P1 has a level greater than the reference voltage Vref, and the analog front-end 120 determines that the microcontroller 130 has failed.

The status indicator circuit 140 of FIG. 4 operates with an opposite polarity as the status indicator circuit 140 described above with reference to FIG. 3.

Figure 5:
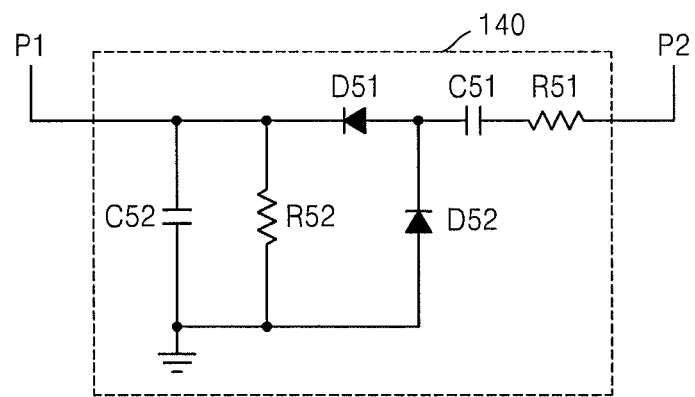
FIG. 5 is a circuit diagram of a status indicator circuit according to another embodiment.

FIG. 5 is a circuit diagram of another embodiment of the status indicator circuit 140 of FIG. 1. Referring to FIG. 5, the status indicator circuit 140 according to the embodiment of FIG. 5 includes a plurality of resistors R51 and R52, a plurality of capacitors C51 and C52, and a plurality of diodes D51 and D52.

In this embodiment, diode D51, the capacitor C51 and the resistor R51 are connected in series between the terminals P1 and P2. A cathode of the diode D51 is connected to the status input terminal P1, and an anode of the diode D51 is connected to the capacitor C51 to prevent a reverse flow of current from the status input terminal P1 to the terminal P2. The capacitor C51 removes an offset component from the operation status signal Sos output through the terminal P2.

The capacitor C52 and the resistor R52 are connected in parallel between the status input terminal P1 and ground. A cathode of the diode D52 is connected to the anode of the diode D51, and an anode of the diode D52 is connected to ground.

In a normal condition, the microcontroller 130 may output, for example, a pulse signal at a repeated constant interval as the operation status signal Sos. As the operation status signal Soc is applied to the status indicator circuit 140, charge is accumulated in the capacitor C52, and a voltage across the capacitor C52 is applied to the status input terminal P1. The failure determination processor 123 has a voltage comparison unit 122, which compares the voltage across the capacitor C52 and the reference voltage Vref, and determines that the microcontrollers 130 is in a normal condition if the voltage across the capacitor C52 has a level greater than the reference voltage Vref. The magnitude of the voltage across the capacitor C52 is determined according to the duty ratio of the operation status signal Sos. The microcontroller 130 controls the duty ratio of the operation status signal Sos so that the voltage across the capacitor C52 has a level greater than the reference voltage Vref if the microcontroller 130 is in a normal condition.

On the other hand, if a failure or malfunction condition occurs, the microcontroller 130 may output a logic low signal or a DC signal as the operation status signal Sos or stops outputting the operation status signal Sos. As a result, charge in the capacitor C52 flow to ground through the resistor R52, and the voltage across the capacitor C52 decreases to a level less than the reference voltage Vref, and the analog front-end 120 determines that the microcontroller 130 has failed.

Figure 6:
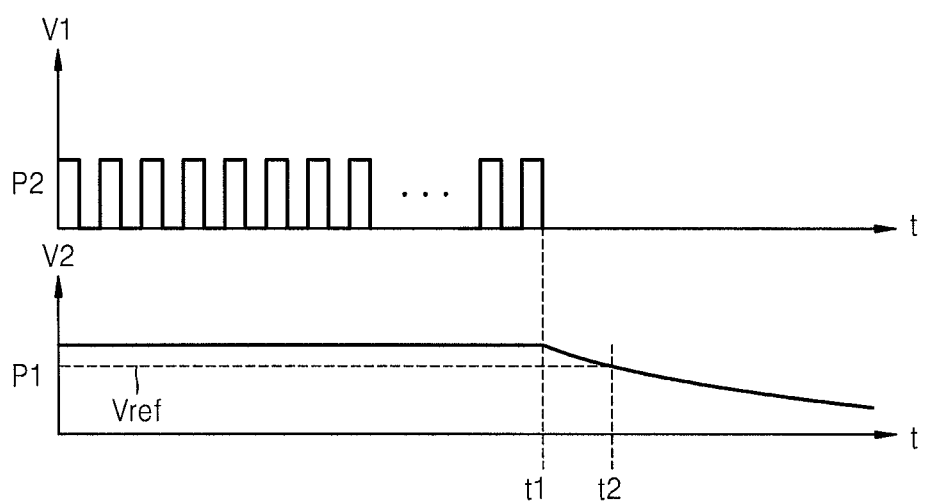
FIG. 6 is a timing diagram of input and output signals of a status indicator circuit, according to an embodiment.

FIG. 6 illustrates a timing diagram of input and output signals of the status indicator circuit 140 of FIG. 5, according to an embodiment, Referring to FIG. 6, a voltage having a level that is greater than or equal to the reference voltage Vref is output to the status input terminal P1 while a pulse signal is received from the terminal P2. Thus, the analog front-end 120 determines that the microcontroller 130 is in a normal condition. However, if the pulse signal is no longer received after a time t1, the capacitor C52 begins to discharge and the voltage across the capacitor C52 decreases and reaches a level that is less than the reference voltage at a time t2. Thus, the analog front-end 120 may determine starting from the time t2 that the microcontroller 130 has failed.

The reference voltage Vref and the components of the status indicator circuit 140 may be designed so that an interval between the time t1 and the time t2 is greater than the width of a logic low period of the pulse signal output from the terminal P2. This may be beneficial because if the width of the logic low period of the pulse signal output from the terminal P2 is greater than the interval between the time t1 and the time t2, the voltage across the capacitor C52 may have a level less than the reference voltage Vref while the pulse signal output from the terminal P2 is at a logic low, leading to an erroneous determination that the microcontroller 130 is having a failure.

As described above, according to the battery protection circuit 100 of FIG. 1, the analog front-end 120 may stop a charging and discharging operation of the battery pack 1 if a failure or malfunctioning of the microcontroller 120 is sensed. Thus, the operation of the battery pack 1 may be stably controlled.

Figure 7:
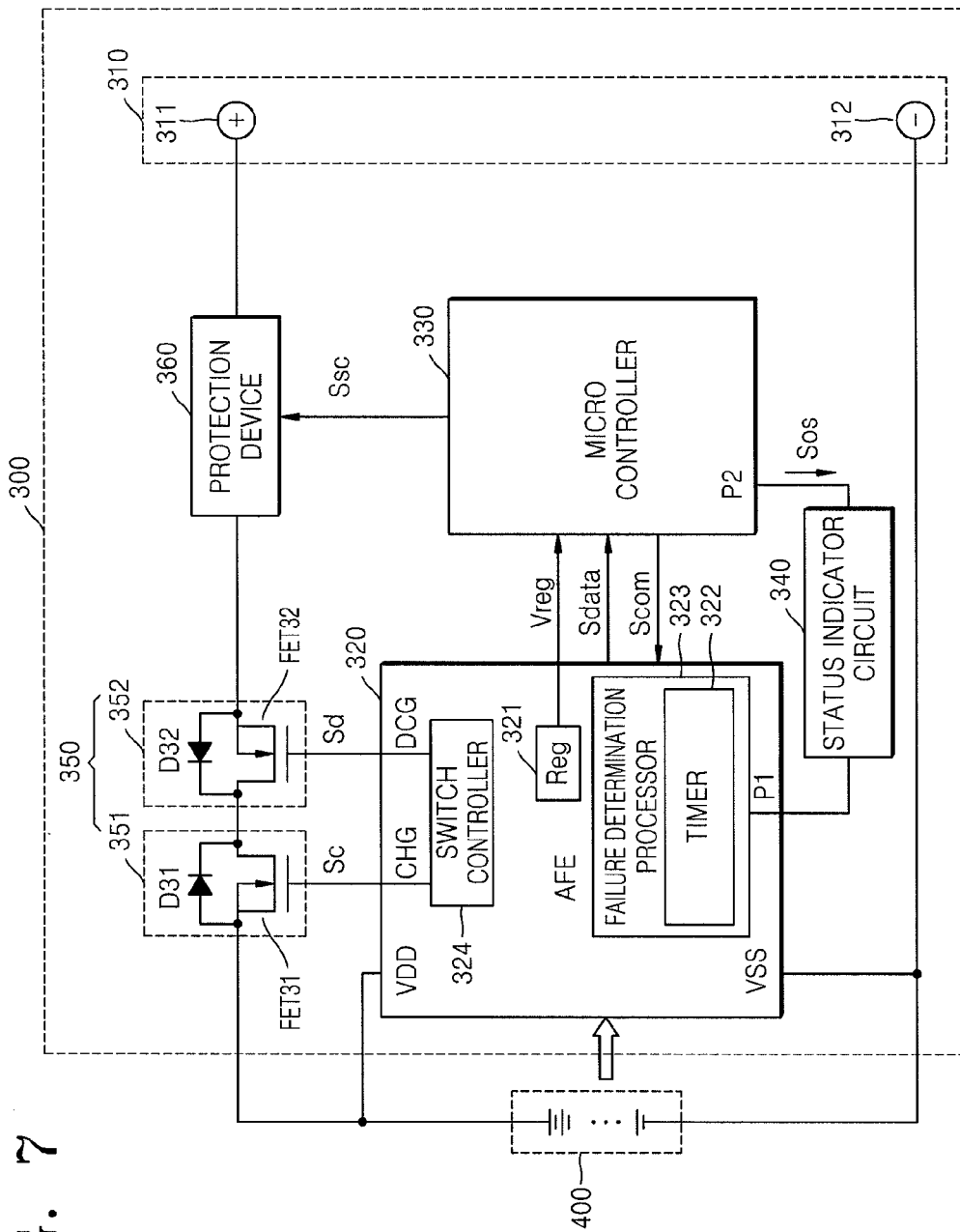
FIG. 7 is a block diagram of a battery pack according to another embodiment.

FIG. 7 illustrates a block diagram of a battery pack 2 according to another embodiment. The battery pack 2 according to the current embodiment has a similar structure and function to those of the battery pack 1 of FIG. 1.

Referring to FIG. 7, the battery pack 2 includes a protection circuit 300 and a battery cell 400. The protection circuit 300 includes a terminal unit 310, an analog front-end 320, a microcontroller 330, a status indicator circuit 340, a charging/discharging switch 350, and a protection device 360.

In the current embodiment, the failure determination processor 323 includes a timer 322. The timer 322 receives the operation status signal Sos from the status indicator circuit 340 via the status indicator circuit 340 and the status input terminal P1, and the analog front-end circuit 320 determines that the microcontroller 330 is malfunctioning if the operation status signal Sos is not received for a reference time duration Δt. Alternatively, the timer 320 may determine that the microcontroller 330 is malfunctioning, if a signal having a level greater than or equal to a reference voltage Vref is received or not received for a reference time duration Δt.

If the analog front-end 320 determines that the microcontroller 130 is malfunctioning, the analog front-end 320 transmits a charge control signal Sc or a discharge control signal Sd to the charging/discharging switch 350 to turn off the charging/discharging switch 350.

An operation of the protection circuit 300 according to an embodiment is described.

Figure 8:
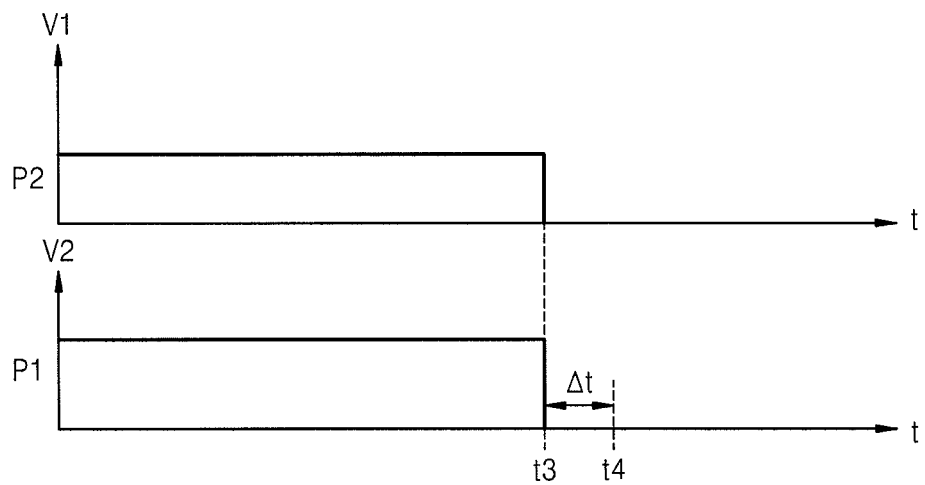
FIG. 8 is a timing diagram of input and output signals of a status indicator circuit, according to another embodiment.

FIG. 8 illustrates a timing diagram of input and output signals of the status indicator circuit 340. The status indicator circuit 340 may, for example, be any one of the circuits of FIGS. 2 through 4.

For example, if the status indicator circuit 340 has a configuration as shown in FIG. 2, when the operation status signal Sos received from the terminal P2 changes from a logic high to a logic low at a time t3, the status signal at the status input terminal P1 changes from a logic high to a logic low at substantially the same time. The failure determination processor 323 uses timer 322 to measure a time duration from the time t3 at which the signal received through the status input terminal P1 changes from the logic high to the logic low, and determines that the microcontroller 330 has failed after the reference time duration Δt. The operating principles of the circuits of FIGS. 3 and 4 are substantially the same as the operation of the circuit of FIG. 2, except for the level of the voltage applied to the status input terminal P1.

Figure 9:
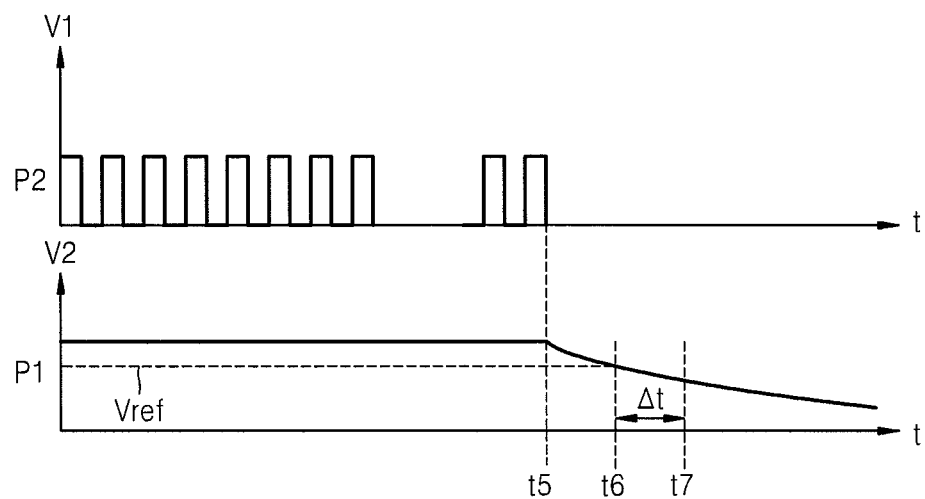
FIG. 9 is a timing diagram of input and output signals of a status indicator circuit, according to another embodiment.

FIG. 9 is a timing diagram of input and output signals of the status indicator circuit 340, according to another embodiment. The status indicator circuit 340 may be the circuit of FIG. 5.

In a normal condition, the microcontroller 330 outputs a pulse signal at an interval as the operation status signal Sos. As the operation status signal Soc is applied to the status indicator circuit 340, charge is accumulated in the capacitor C52, and a voltage across the capacitor C52 is applied as the status signal to the status input terminal P1. The failure determination processor 323 uses timer 322 to determine that the microcontroller 330 is in a normal condition if a status signal having a level is continuously applied to the status input terminal P1.

On the other hand, if a failure or malfunction condition occurs, the microcontroller 330 may output a logic low signal as the operation status signal Sos or stops outputting the operation status signal Sos. Then, the capacitor C52 begins to discharge, and the level of the voltage across the capacitor 52 is reduced to a level less than the level of the reference voltage Vref from a time t6. The failure determination processor 323 uses timer 322 to measure a time duration from the time t6, and determines that the microcontroller 330 is having a failure, if the time duration reaches the reference time duration (Δt).

The reference voltage Vref and the reference time duration Δt may be defined so that an interval between the time t5 and the time t7 is to be greater than the width of a logic low period of the pulse signal output from the terminal P2 for the following reason. If the width of the logic low period of the pulse signal output from the terminal P2 is greater than the interval between the time t5 and the time t7, the voltage across the capacitor C52 may have a level less than the reference voltage Vref and the reference time duration Δt may have lapsed while the pulse signal from the terminal P2 is at a logic low, leading to an erroneous determination that the microcontroller 330 is having a failure.

As described above, in the battery protecting circuit 300, the analog front-end 320 may stop charging and discharging of the battery pack 2 if a failure or malfunction of the microcontroller 330 is sensed. Thus, the operation of the battery pack 2 may be stably controlled.

Figure 10:
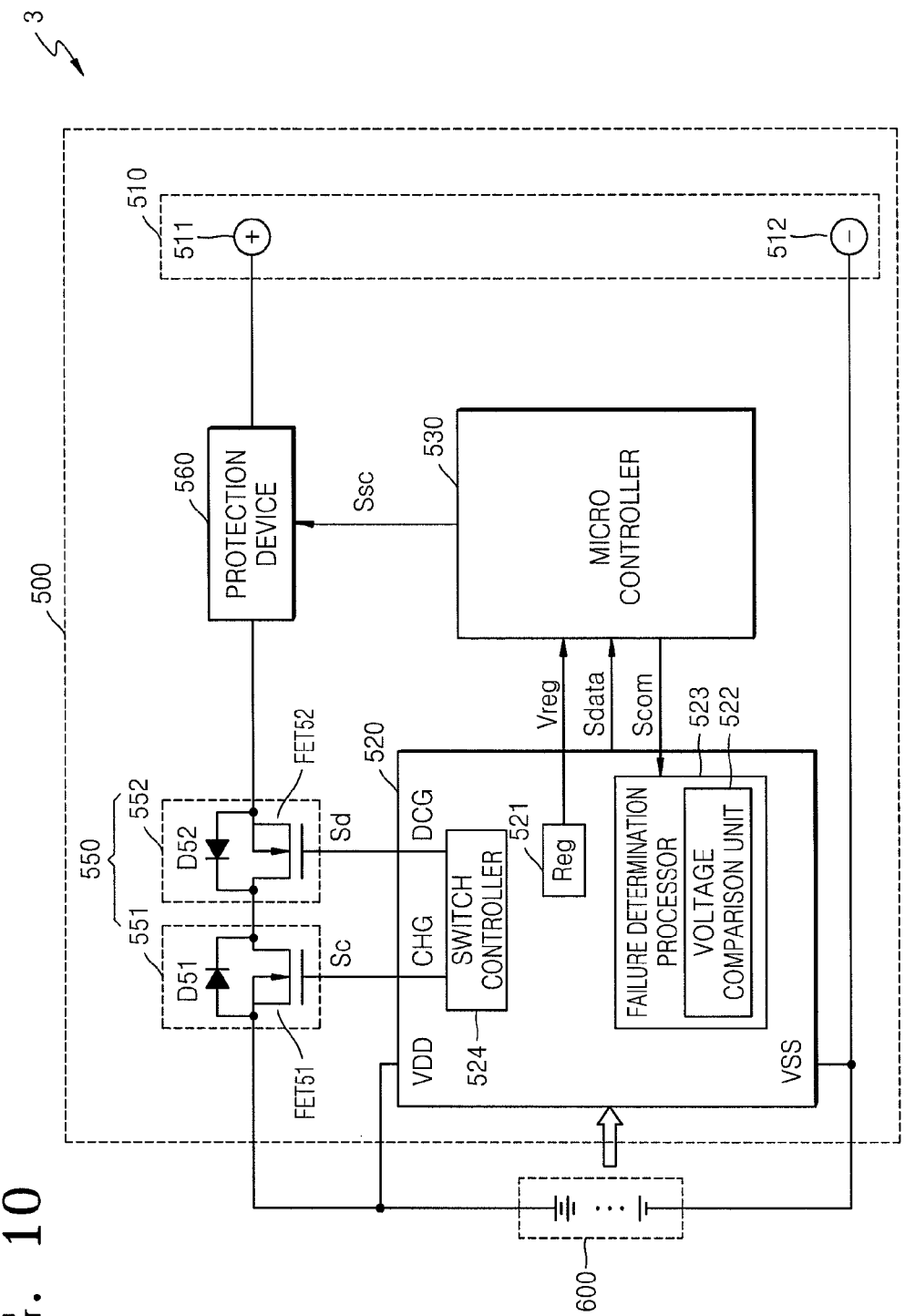
FIG. 10 is a block diagram of a battery pack according to another embodiment.

FIG. 10 illustrates a block diagram of a battery pack 3 according to another embodiment. The battery pack 3 has a similar structure and function to that of the battery pack 1 of FIG. 1.

Referring to FIG. 10, the battery pack 3 includes a protection circuit 500 and a battery cell 600. The protection circuit 500 includes a terminal unit 510, an analog front-end 520, a microcontroller or processor 530, a charging/discharging switch 560, and a protection device 560.

The analog front-end 520 includes a failure determination processor 522. The failure determination processor 523 receives a command signal Scom from the microcontroller 530. The failure determination processor 523 may determine whether the microcontroller 530 has failed or is malfunctioning by comparing the voltage level of the command signal Scom with a reference voltage Vref. In addition, since the command signal Scom is used to determine the operation condition of the microcontroller 530, the microcontroller 530 and the analog front-end 520 may have a reduced number of ports. The method in the failure determination processor 523 of determining whether the microcontroller 530 is having a failure or is malfunctioning may be similar to that described above with reference to other embodiments.

In some embodiments, the command signal Scom is monitored by the failure determination processor 523 and the status signal is encoded within the commands of the command signal Scorn. In some embodiments, the frequency of command generation is monitored to determine whether the microcontroller 530 is functioning properly, and if the frequency of command generation is below a threshold, the failure determination processor 523 determines that the microcontroller 530 has experienced a failure.

As described above, in the battery protecting circuit 500 according to the current embodiment, the analog front-end 520 may stop a charging and discharging operation of the battery pack 3 if a failure or malfunctioning of the microcontroller 530 is sensed. Thus, the operation of the battery pack 3 may be stably controlled.

Figure 11:
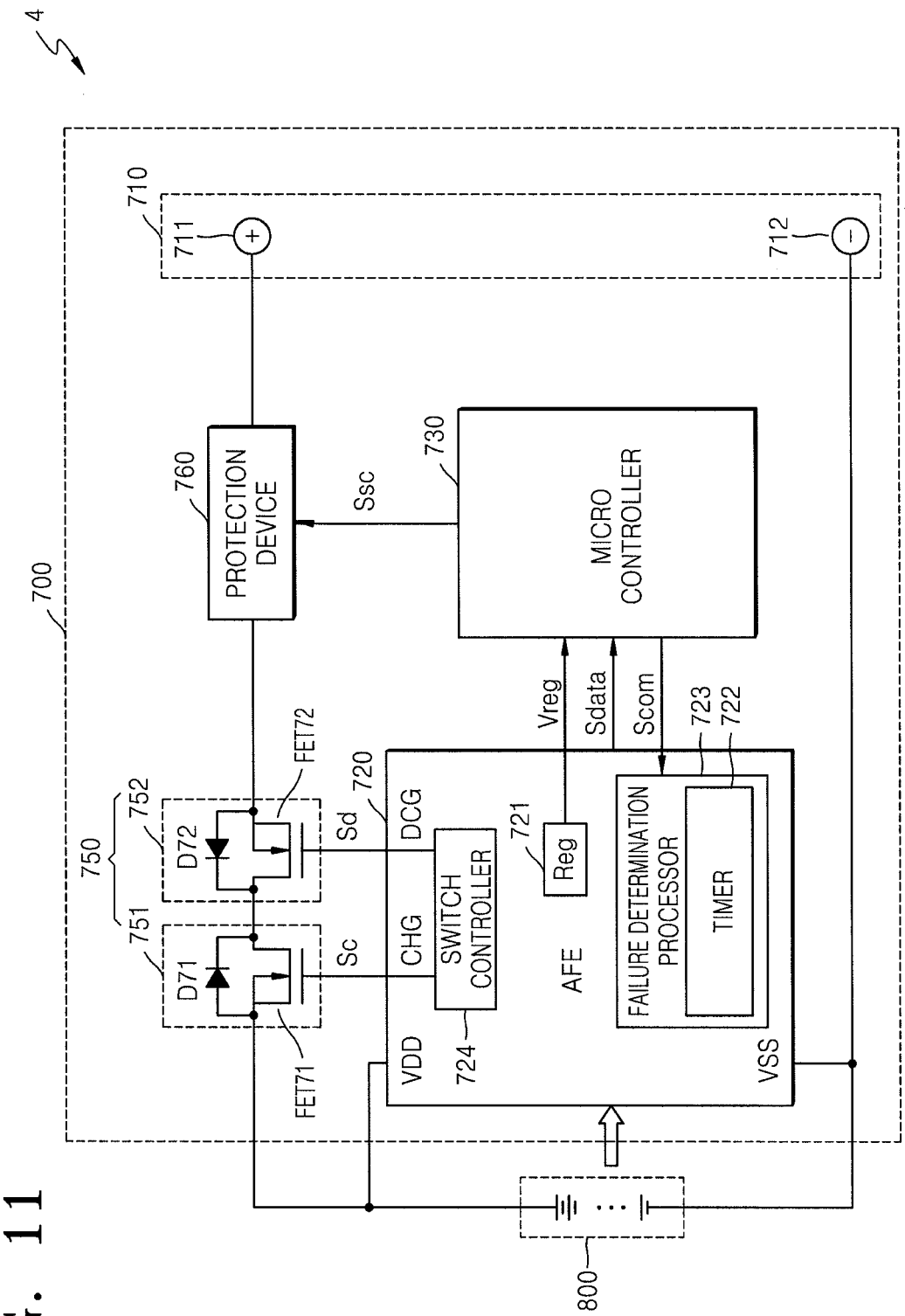
FIG. 11 is a block diagram of a battery pack according to another embodiment.

FIG. 11 illustrates a block diagram of a battery pack 4 according to another embodiment. The battery pack 4 has a similar structure and function to that of the battery pack 3 of FIG. 10.

Referring to FIG. 11, the battery pack 4 includes a protection circuit 700 and a battery cell 800. The protection circuit 700 includes a terminal unit 710, an analog front-end 720, a microcontroller 730, a charging/discharging switch 750, and a protection device 760.

In the battery pack 4, the failure determination processor 723 includes a timer 722. The timer 722 receives a command signal Scom transmitted from the microcontroller or processor 730. Using the timer 722, the failure determination processor 723 determines whether the command signal Scom is transmitted, and determines that the microcontroller 720 is having a failure if the signal Scom does not indicate normal function for a reference time duration ($\Delta t$). Thus, in battery pack 4, the protection circuit 700 may not include the status indicator circuit 140 of FIG. 1. In addition, since the command signal Scom is used to determine the operation condition of the microcontroller 730, the microcontroller 730 and the analog front-end 720 may have a reduced number of ports. The method of determining whether the microcontroller 730 is having a failure or is malfunctioning may be similar to that described above with reference to other embodiments.

As described above, in the battery protecting circuit 700, the analog front-end 720 may stop charging and discharging of the battery pack 4 if a failure or malfunctioning of the microcontroller 730 is sensed. Thus, the operation of the battery pack 4 may be stably controlled.

Programs for executing the control methods according to the one or more embodiments of the present invention in the battery protecting circuits 100, 300, 500, and 700 and the battery packs 1 through 4 may be stored in non-transitory computer readable media. The media may be semiconductor media, for example, flash memory. The media are readable and comprise instructions, which are executable by a processor. The methods may be performed by various modules. As can be appreciated by one of ordinary skill in the art, each of the modules may comprise various sub-routines, procedures, definitional statements, and macros. Each of the modules may be separately compiled and linked into a single executable program. Therefore, the following description of each of the method steps is used for convenience to describe the functionality of the methods. Thus, the processes that are undergone by each of the modules may be arbitrarily redistributed to one of the other modules, combined together in a single module, or made available in a shareable dynamic link library. Further each of the modules may be implemented in hardware as functional blocks.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

While the above-detailed description has shown, described, and pointed out novel features of the invention as applied to various embodiments, it will be understood that various omissions, substitutions, and changes in the form and details of the device or process illustrated may be made by those skilled in the art without departing from the scope of the re as defined by the appended claims.

It should be understood that the exemplary embodiments described herein should be considered in a descriptive sense and not for purposes of limitation. Descriptions of features or aspects within each embodiment should typically be considered as available for other similar features or aspects in other embodiments.

What is claimed is:

1. A battery pack, comprising
a battery cell;
a terminal unit;
a switch selectively connecting the battery cell and the terminal unit;
a control processor that generates commands; and
an analog front end that receives the commands from the control processor and controls charging and discharging of the battery cell according to the commands, wherein the analog front end comprises:
- a status input terminal connected to the control processor and that receives a status signal indicative of a status of the control processor,
- a failure determination, processor connected to the status input terminal to receive the status signal, the failure determination processor generating a failure signal based on the status signal, the failure signal being indicative of whether the control processor has experienced a failure, and
- a switch controller connected to the failure determination processor to receive the failure signal, wherein the switch controller further connects to the switch and outputs a control signal to control the switch according to the failure signal.

2. The battery pack of claim 1, wherein the failure determination processor comprises a voltage comparison unit that compares the status signal with a reference voltage, and the failure determination processor generates a failure signal if the status signal is greater than the reference voltage.

3. The battery pack of claim 1, wherein the failure determination processor comprises a voltage comparison unit that compares the status signal with a reference voltage, and the failure determination processor generates a failure signal if the status signal is less than the reference voltage.

4. The battery pack of claim 1, wherein the failure determination processor comprises a timer, and the failure determination processor generates a failure signal if the status signal is indicative of processor failure for a duration greater than a minimum time.

5. The battery pack of claim 4, further comprising a status indicator circuit that generates the status signal based on an operation status signal received from the control processor.

6. The battery pack of claim 5, wherein the status indicator circuit comprises a low pass filter.

7. The battery pack of claim 6, wherein the operation status signal comprises a plurality of pulses if the control processor has not experienced a failure.

8. The battery pack of claim 1, further comprising a status indicator circuit that generates the status signal based on an operation status signal received from the control processor.

9. The battery pack of claim 8, wherein the status indicator circuit comprises a low pass filter.

10. The battery pack of claim 9, wherein the operation status signal comprises a plurality of pulses if the control processor has not experienced a failure.

11. The battery pack of claim 8, wherein the status indicator circuit comprises a level shifter.

12. The battery pack of claim 11, wherein the level shifter comprises an inverter.

13. The battery pack of claim 1, wherein the status signal is encoded within the commands.

14. The battery pack of claim 13, wherein the status signal is a frequency of command generation.

15. The battery pack of claim 14, wherein the failure determination processor generates a failure signal if the frequency of command generation is less than a threshold.

16. The battery pack of claim 14, wherein the control processor is a microcontroller.

* * * * *

UNITED STATES PATENT AND TRADEMARK OFFICE
CERTIFICATE OF CORRECTION

PATENT NO. : 8,865,328 B2  
APPLICATION NO. : 13/037158  
DATED : October 21, 2014  
INVENTOR(S) : Beom-Gyu Kim Page 1 of 1

It is certified that error appears in the above-identified patent and that said Letters Patent is hereby corrected as shown below:

In the Specification,

Column 6, Line 48, please delete "Soc" and insert therefore, --Sos--.

Column 7, Line 6, please delete "embodiment," and insert therefore, --embodiment.--.

Column 8, Line 19, please delete "Soc" and insert therefore, --Sos--.

In the Claims,

In Column 11, Line 6, in Claim 1, please delete "determination," and insert therefore, --determination--.

Signed and Sealed this  
Twelfth Day of May, 2015

Michelle K. Lee  
*Director of the United States Patent and Trademark Office*